United States Patent
Eastman et al.

(12) 
(10) Patent No.: US 6,216,266 B1
(45) Date of Patent: Apr. 10, 2001

(54) REMOTE CONTROL SIGNAL LEVEL METER

(75) Inventors: Jon M. Eastman, Beverly Hills; Gregory R. Sasaki, Long Beach, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/428,666

(22) Filed: Oct. 28, 1999

(51) Int. Cl.$^7$ ........................................ H04N 5/50
(52) U.S. Cl. ............................. 725/72; 348/570
(58) Field of Search ........................ 348/180, 191, 348/192, 553, 563, 569, 570, 725, 731, 734; 455/3.2; 725/72

(56) References Cited

U.S. PATENT DOCUMENTS

| | | | |
|---|---|---|---|
| 5,386,587 | * 1/1995 | Yuzawa | 455/3.2 |
| 5,396,293 | * 3/1995 | Shellard | 348/489 |
| 5,677,895 | * 10/1997 | Mankovitz | 368/10 |
| 5,966,186 | * 10/1999 | Shigihara et al. | 348/570 |
| 5,973,756 | * 10/1999 | Erlin | 348/734 |
| 6,011,511 | * 1/2000 | Chuong et al. | 342/359 |
| 6,075,330 | * 6/2000 | Terk | 318/280 |

FOREIGN PATENT DOCUMENTS

06351023 * 12/1994 (JP) .
11136708 * 5/1999 (JP) .

* cited by examiner

*Primary Examiner*—Andrew Faile
*Assistant Examiner*—Ngoc Vu
(74) *Attorney, Agent, or Firm*—John A. Crook; Michael W. Sales

(57) ABSTRACT

A method and apparatus for adjusting an antenna to maximize the strength of a program information signal. A first embodiment of the apparatus includes a remote control comprising a user input interface, for accepting at least one user input command and for translating the user input command into at least one command signal; a remote control receiver, for receiving a first signal from a controlled device, wherein the first signal is indicative of a measured quality of a second signal received by the controlled device; a remote control processor, communicatively coupled to the user input interface and the remote control receiver, for processing the received first signals, and for generating coded signals according to the command signal; a remote control transmitter, communicatively coupled to the remote control processor, for transmitting the coded signals to the controlled device to execute the user command; and a user output interface communicatively coupled to the remote control processor, for presenting the processed received signals. A second embodiment includes a set top box comprising a first set top box receiver for receiving a first signal having program information; a second set top box receiver for receiving coded command signals from a remote control; a set top box processor for determining at least one parameter indicative of a measured quality of the first signal; and a set top box transmitter, communicatively coupled to the processor, for transmitting a second signal having information including the parameter to the remote control.

20 Claims, 3 Drawing Sheets

REMOTE CONTROL SIGNAL LEVEL METER

BACKGROUND OF THE INVENTION

1. Field of the Invention

The present invention relates to systems and methods of transmitting and receiving audio/visual information, and in particular to a method and system allowing a user to remotely determine the strength of a signal received on an antenna.

2. Description of the Related Art

Traditionally, television programming has been delivered to viewers at home by very high frequency (VHF) and ultra high frequency (UHF) transmission from local broadcasting facilities. In the 1980s, dish antennas and receivers became available, allowing home viewers to receive television programming directly from satellite transmissions. Typically, however, these dish antennas were large and unsightly, and required professional installation. In the 1990s, satellite television service evolved to include smaller dish antennae and specially designed receivers. These smaller dish antennae are visually unobtrusive and can be installed by the viewer.

After the dish antenna is secured to a mounting, it must be aligned. This involves physically boresighting the antenna so that its sensitive axis is directed at the broadcasting satellite. Since the user cannot determine the precise location of the broadcasting satellite and because reasonably precise pointing is required, this task cannot be accomplished by simply visual boresighting. Instead, the strength of the signal from the satellite is measured and an indication of the signal strength is presented to the installer. In many cases, this involves a graphical and/or aural depiction of a relative received signal strength presented by an attached display device, such as a television.

The problem with the foregoing method is that the antenna and the television are typically separated by a substantial distance. Often, the antenna is installed on the roof of the home or on an outside wall, while the television is inside the home. In such cases, the antenna boresighting operation requires either two persons to complete, or requires that the installer travel back and forth between the antenna and the television several times, while trying to adjust the antenna for maximum signal reception.

In other devices, a visual indication is presented at a low noise block converter (LNB) of the satellite antenna. Circuits incorporated into the LNB measure the relative strength of the signal at the LNB and provide a visual indication of that signal. This is implemented, for example, by a variable duty cycle drive coupled to an output light emitting diode (LED), thus presenting a flashing rate to the user corresponding to the signal strength at the LNB. The user can then boresight the antenna by angularly displacing the antenna to maximize the strength of the received signal.

The problem with this method is that the LNB is typically capable of less precise measurements than are provided by circuits in the set top box. Further, some signal quality measurement parameters, such as bit error rate, or multipath distortion, cannot be measured at the LNB without substantial modifications. Moreover, more complex aiming algorithms utilizing outputs from multiple LNBs (e.g. for receiving signals from multiple satellites) cannot be supported by this approach.

What is needed is a system that allows precision antenna orientation adjustments to be made by a single user without making several trips to the television. The present invention satisfies that need.

SUMMARY OF THE INVENTION

To address the requirements described above, the present invention discloses an apparatus and method for adjusting an antenna to maximize the strength of a program information signal.

The apparatus is described by two primary embodiments. The first embodiment includes a remote control comprising a user input interface, for accepting at least one user input command and for translating the user input command into at least one command signal; a remote control receiver, for receiving a first signal from a controlled device, wherein the first signal is indicative of a measured quality of a second signal received by the controlled device; a remote control processor, communicatively coupled to the user input interface and the remote control receiver, for processing the received first signals, and for generating coded signals according to the command signal; a remote control transmitter, communicatively coupled to the remote control processor, for transmitting the coded signals to the controlled device to execute the user command; and a user output interface communicatively coupled to the remote control processor, for presenting the processed received signals.

The second embodiment includes a set top box comprising a first set top box receiver for receiving a first signal having program information; a second set top box receiver for receiving coded command signals from a remote control; a set top box processor for determining at least one parameter indicative of a measured quality of the first signal; and a set top box transmitter, communicatively coupled to the processor, for transmitting a second signal having information including the parameter to the remote control.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
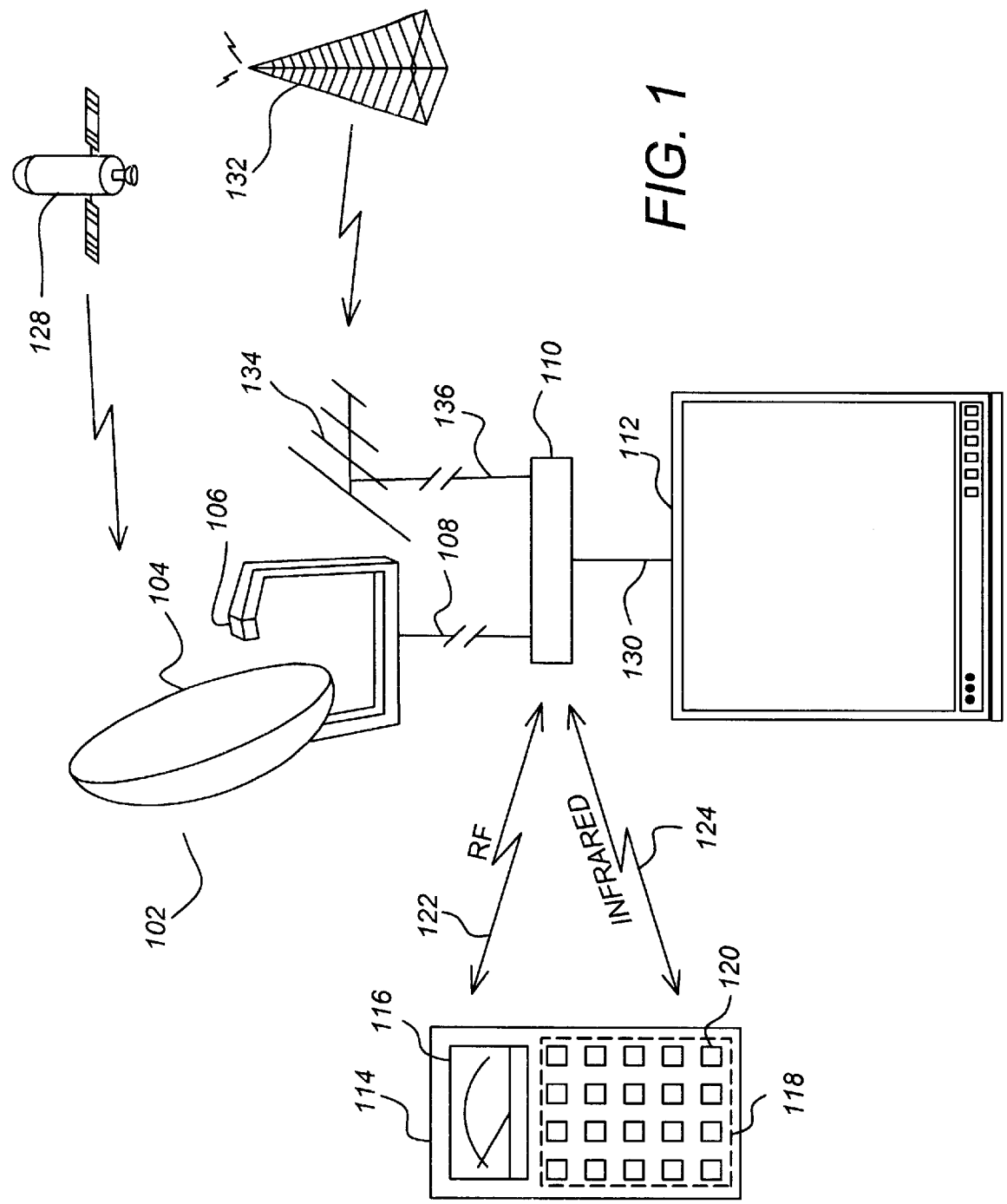
FIG. 1 is a diagram presenting a system view of key elements of the present invention.

FIG. 1 is a diagram presenting a system view of key elements of the present invention. A satellite 128 broadcasts a transmission having a digital or analog program information signal to a satellite antenna 102. The satellite antenna 102 comprises a reflector 104, which collects the energy transmitted from the satellite 128 (typically, in the Ku band), and focuses the energy on an LNB 106. The LNB 106 generates a signal from the received energy, which is provided to the set top box 110 via a shielded coaxial cable 108 or similar device.

In the alternative or in combination with the foregoing, the set top box 110 may also receive a terrestrial broadcast from a Multichannel Multipoint Distribution Service (MMDS), Local Multipoint Distribution Service (LMDS), or very high frequency (VHF) or ultrahigh frequency (UHF) broadcast transmitter 132 via a terrestrial signal antenna 134. The program information signal is provided to the set top box 110 via an appropriate interconnection such as a coax cable 136.

The set top box 110 receives, decodes, and demodulates the signal from the LNB 106 and/or the terrestrial antenna 134, and provides a video signal 130 to an appropriate output/processing device such as a television (TV) 112, computer with a communicatively coupled display, or similar audio/visual presentation device. In one embodiment, the set top box 110 is an integrated receiver/decoder (IRD).

The set top box 110 is remotely controllable by a remote control 114. The remote control 114 comprises a user input interface 118 typically comprising a plurality of buttons 120 or other user input devices (e.g. touch pad, joystick, mouse, etc.) for accepting user commands. These user commands are used to generate coded signals, which are transmitted to the set top box 110 via communications link 124. Typically, these coded signals are transmitted at infrared (IR) wavelengths, but other wavelengths or frequency bands, such as radio frequency (RF) wavelengths may be used as well.

As described above, it is important that the antennae 102, 134 are directed so that their sensitive axis is directed at the source of the broadcast signal (e.g., the satellite 132 and terrestrial transmitting antenna 132, respectively). The antennae 102, 134 are usually placed where there is a substantially unobstructed line of sight access to the satellite 128 terrestrial transmitting antenna 132, while the output/processing device 112 is typically inside the home. Thus, the person adjusting the antenna typically cannot assess the strength or quality of the received signal while adjusting the antennae 102, 134. Hence, for a consumer not possessing specialized installation equipment, the adjustment process typically requires the services of either two persons, or requires numerous trips between the antenna 102, 134 and the output/processing device 112 by one person.

The present invention solves this problem by providing an indication of a parameter related to the measured quality of the signal received by the set top box 110 to the user adjusting the antenna, even when the use is remotely located from the output/processing device 112. This indication is received via a secondary communications link 122B and a user output interface 116 of the remote control 114 which presents an indication of the measured quality of the signal received at the set top box 110.

The quality factor may include any factor suitably related to accurate antenna aiming. In one embodiment, this includes the measured strength of the program information signal as it is received at the set top box 110.

Other factors may also be used, including the measured spectral content of the program information signal, measured multipath interference, or interfering bleed-over from adjacent channels or transmitters. Where the program information signal comprises digital information, the measured bit error rate of the digital information may be used as a suitable quality factor.

The quality factor may be based on measurements taken at any stage or combination of stages in the process of receiving the program information signal (i.e. after the detection, demodulation, or intermediate frequency (IF) stages) as appropriate.

Figure 2:
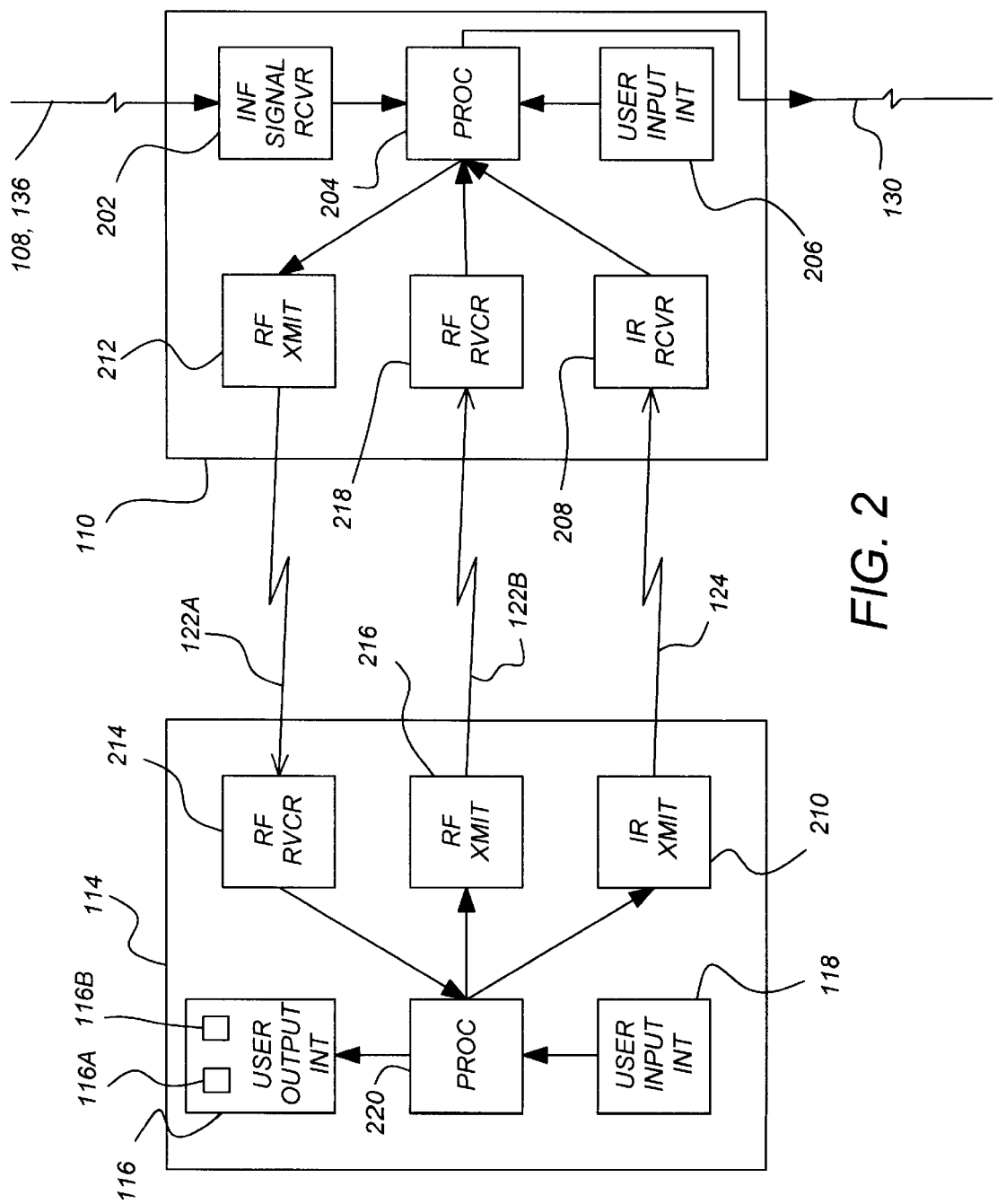
FIG. 2 is a diagram presenting a block diagram of the remote control and the set top box of the present invention.

FIG. 2 is a block diagram of the set top box 110 and the remote control 114. The set top box 110 comprises a program information signal receiver 202, which receives the program information signal from the satellite antenna 102 or the conventional antenna 134. In cooperation with a communicatively coupled set top box processor 204, the set top box receiver 202 demodulates and decodes the received program information signal, and transforms that signal into a video (or audio) signal 130 that is in suitable form for reproduction by the output/processing device 112 or other presentation device.

The set top box 110 accepts commands from the user in at least two ways. User commands can be provided to the set top box 110 via a set top box user input interface 206, which is communicatively coupled to the set top box processor 204 which implements execution of the user command.

User commands can also be provided to the set top box via the remote control 114. The remote control 114 comprises a user input interface 118, which accepts user commands and translates those commands into command signals. These command signals are provided to the remote control processor 220, which generates coded signals according to the command signals from the user input interface 118. These coded signals are provided to a remote control transmitter 210, which transmits the control signals to the set top box 110 via communications link 124. In one embodiment, the communications link 124 is provided in infrared (IR) frequencies using an IR light emitting diode (LED), however, communications link 124 may be a radio frequency (RF), visible light, ultraviolet (UV), or other link. The control signals are received by the set top box command receiver 208 and provided to the set top box processor 204 which implements the execution of the user command.

In addition to or as an alternative to the above, the present invention may also comprise a second communication link 122B from the remote control 114 to the set top box 110. This communication link 122B is implemented by a second remote control transmitter 216 communicatively coupled to the remote control processor 220 transmitting to a second set top box receiver 218 communicatively coupled to the set top box processor 204. This second communication link 122B can be used to augment the information provided by the first communication link 124. For example, if the first communications link 124 uses IR frequencies, the second communication link 122B can be used in situations where the first communication link 122A has been severed due to interference, excessive range, or interfering objects. The second communication link 122B can also be used to transmit data where higher bandwidth or higher security is desired.

In addition to the above, the set top box 110 includes hardware and/or software modules capable of determining the quality factors and parameters from the received program information signal, as described above. These circuits and algorithms are enabled upon user command (i.e. when the user wishes to boresight the antennae 102, 134).

When enabled, electronic circuitry in the set top box 110 is used to determine the quality factors described above. In some instances, the quality factor can be determined by the electronic circuitry alone, without significant set top box processor 204 involvement. In other instances, the quality factor is determined by measuring characteristics of the program information signal, and processing these measured characteristics with the set top box processor 204 and/or auxiliary processors to arrive at a measured quality factor.

For example, to determine the signal strength, measurements of the program information signal are processed to determine the strength of the received program information signal, characteristics of the program information signal are periodically measured and converted into data representing signal strength. If desired, the set top box processor 204 can further process the data for better presentation to the user. For example, measured signal strength measurements can be averaged or otherwise low pass filtered to reduce noise and other measurement errors. The data can be augmented with other useful information, such as the tuned channel, if desired before transmission to the remote control 114.

The set top box 110 also comprises a set top box transmitter 212, which is communicatively coupled to the set top box processor 204. The set top box transmitter 212 transmits a signal having information including the parameter or parameters described above to the remote control 114 via communications link 122A. In one embodiment, the communication link 122A is implemented such that the signal from the set top box 110 is received by the remote control 114 regardless of whether there are intervening walls or other obstacles between the remote control 114 and the set top box 110. This may be implemented by using RF transmission frequencies.

Typically, the signal transmitted to the remote control 114 by the set top box 110 is transmitted over a constant periodic interval (i.e. every 0.5 seconds). Alternatively, the signal may be transmitted by the set top box 110 only when the difference between the previous data sent to the remote control 114 and the most recently measured data exceeds a preset or selectable threshold. For example, data may be sent from the set top box 110 to the remote control 114 whenever the new signal strength measurement is at least 0.25 dB different than the previous measurement.

The signal transmitted by the set top box transmitter 212 is received by the remote control receiver 214, decoded, and provided to the remote control processor 220. The remote control processor 220 uses the received signals to drive a communicatively coupled user output interface 116 to present the information in the processed received signals to the user. In one embodiment, the remote control processor 220 comprises a controller integrated circuit (IC) such as a micro control unit (MCU).

In one embodiment, the remote control 114 includes a memory communicatively coupled to the remote control processor 220. This memory may include, for example, a buffer for temporarily storing data received from the set top box 110, before the data is presented to the user on the user output interface 116. The memory may also include a read only memory (ROM) for storing processor instructions for communicating and routing of data, and/or a random access memory (RAM) for storing commands implementing other remote control 114 functions.

The user output interface 116 can take many forms. In one embodiment of the present invention, the user output interface 116 comprises a visual display 116A signal meter such as an electro-magnetically activated signal meter such as a D'Arsovnal meter. This may be implemented with the use of circuit to convert digital signal strength information into an analog signal (such as a D/A), and a driver.

Alternatively or in combination with the above, the user output interface 116 may comprise a light emitting diode (LED) display or a liquid crystal display (LCD). The display may include a simple series of segments or may include a matrix of segments that allows the display of multi-segment images or alphanumeric text. In such case, the present invention can be advantageously implemented by using existing display devices implemented in the remote control 114.

In an embodiment of the invention that is particularly useful where the parameter to be conveyed to the user is the strength of the program information signal received by the set top box 110, the user output interface includes an aural reproduction device 116B such as a piezoelectric transducer. In this case, signal strength information can be conveyed by the volume or frequency of the aural signal produced, or may be conveyed by a series of pulses whose frequency or pulse width changes with signal strength. To further simplify the operation and requirements of the user output interface 116, the set top box processor 204 or the remote control processor 220 can determine when the signal strength is at a maximum (or an undesirable quality factor is at a minimum), and activate the user output interface 116 only when this maximum or minimum is achieved. For additional convenience, the maximum or minimum measured quality factors can be stored and used as a "target" for further adjustments.

The term "set top box" as used herein, is intended to refer to any device capable of receiving program information signals, and need not be physically distinct from the presentation device. For example, the set top box may be an integral portion of the television, or a video recording device such as a video cassette recorder (VCR) in communication with the television. Further, while the set top box has been described as receiving broadcast television signals from a satellite 128, the scope of the present invention is not so limited. The set top box and remote control of the present invention can also be used to receive terrestrial signals such as UHF and VHF broadcast signals, and to align a conventional multi or single element antenna to maximize signal reception or to minimize multipath distortion. For that matter, the present invention can also be used with other program information sources, such as MMDS, LMDS, or audio program material broadcast by satellite or on amplitude modulation (AM) and frequency modulation (FM) frequency bands.

The foregoing can be used to transmit a wide variety of parameters to the user via the remote control 114. For example, in embodiments wherein the set top box is incorporated into a VCR, the communications link 122A can be used to indicate VCR functions, such as when a tape has completed rewinding, or to what channel the VCR is tuned. This link also permits the set top box 110 to initialize the remote control 114 with new or additional programming for the remote control processor 220, or to command the remote control to beep or otherwise announce itself so that it might be more easily located.

Figure 3:
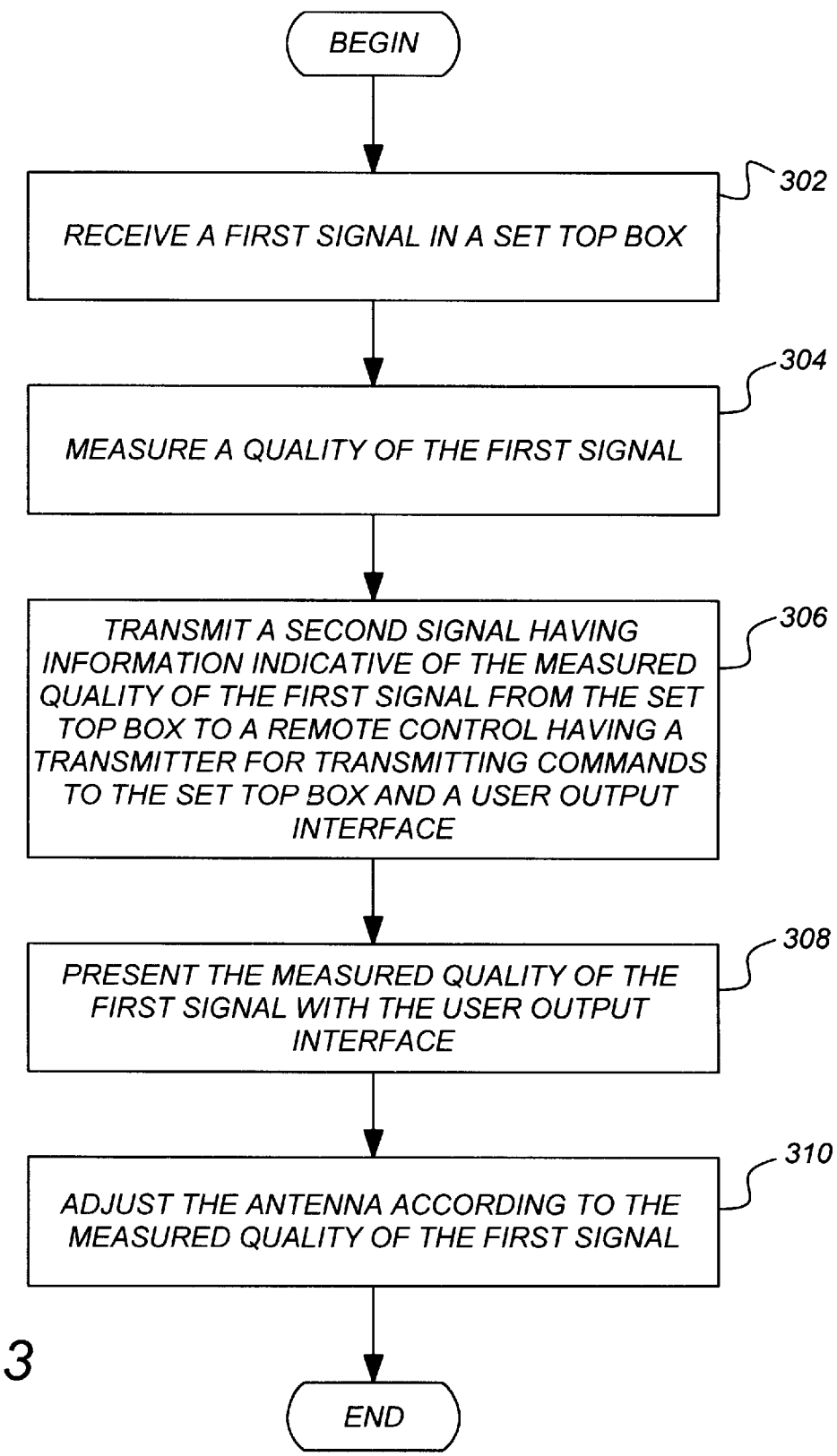
FIG. 3 is a flow chart presenting exemplary process steps used to practice one embodiment of the present invention.

FIG. 3 is a flow chart showing exemplary process steps used to practice an embodiment of the present invention. First, a first signal such as the program information signal is received 302 in the set top box 110. Then, a quality factor of the program information signal is measured 304. A signal is then transmitted from the set top box 110 to the remote control 114, as shown in block 306. The signal has information indicative of the measured quality of the program information signal received by the set top box 110. An indication of the measured quality of the program information signal is then presented to the user on the remote control's user output interface 116. The user may then adjust the antennae 102, 134 according to the measured quality of the program information signal, as shown in block 310.

Using the foregoing teaching, other embodiments of the present invention may be realized. For example, as described earlier in this disclosure, the set top box 110 may provide the user with a wide variety of measurement parameters. Accordingly, the information transmitted from the set top box 110 to the remote control 114 may include information that is independent from the program information signal. It may instead be derived solely from set top box 110 parameters such as status or self test, information. Although expensive, the set top box may also transmit a low power video signal to the remote control 114, which may embody a small LCD or LED video presentation device for the user output interface 116. Thus, the user may see an accurate indication of picture quality, instead of signal strength alone. This embodiment also has the advantage of allowing the remote user to view virtually anything that would otherwise be viewed on the output/processing device 112.

CONCLUSION

This concludes the description of the preferred embodiments of the present invention. In summary, the present invention describes an apparatus and method for adjusting an antenna to maximize the strength of a program information signal.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A remote control device, comprising:
   a user input interface, for accepting at least one user command and for translating the user command into at least one command signal;
   a remote control receiver, for receiving a first signal from a controlled device, the first signal includes first information and second information distinct from the first information;
   a remote control processor, communicatively coupled to the user input interface and the remote control receiver, for processing the received first signal, and for generating coded signals according to the command signal;
   a remote control transmitter, communicatively coupled to the remote control processor, for transmitting the coded signals to the controlled device to execute the user command; and
   a user output interface communicatively coupled to the remote control processor, for presenting the processed received signals;
   wherein the first information is indicative of a measured quality of a second signal received by the controlled device and the second information comprises augmenting information, distinct from the information indicative of the measured quality of the second signal received by the controlled device.

2. The apparatus of claim 1, wherein the first information includes a measured quality of the second signal including a measured strength of the second signal received by the controlled device.

3. The apparatus of claim 1, wherein the second signal comprises digital information and the measured quality is the bit error rate of the digital information.

4. The apparatus of claim 1, wherein the user output interface comprises a visual display.

5. The apparatus of claim 1, wherein the user output interface comprises an aural reproduction device.

6. The apparatus of claim 1, wherein the remote control receiver receives signals at a first frequency, and the remote control transmitter transmits signals at a second frequency.

7. The apparatus of claim 6, wherein the first frequency is a radio frequency (RF), and the second frequency is an infrared (IR) frequency.

8. The apparatus of claim 6, further comprising a second remote control transmitter communicatively coupled to the remote control processor, the second remote control transmitter for transmitting the command signals to the controlled device at the first frequency.

9. The apparatus of claim 1, wherein the remote control receiver receives signals and the remote control transmitter transmits signals at a radio frequency.

10. A set top box, comprising:
    a first set top box receiver for receiving a first signal having program information;
    a second set top box receiver for receiving coded command signals from a remote control;
    a set top box processor for determining at least one parameter indicative of a measured quality of the first signal; and
    a set top box transmitter, communicatively coupled to the set top box processor, for transmitting a second signal having first information including the parameter and second information distinct from the first information to the remote control;
    wherein the second information includes a channel number.

11. The apparatus of claim 10, wherein the set top box transmitter transmits and the set top box receiver receives signals at a radio frequency.

12. The apparatus of claim 10, wherein the second set top box receiver receives commands at a first frequency and the set top box transmitter transmits the signal at a second frequency.

13. The apparatus of claim 12, wherein the first frequency is an infrared (IR) frequency, and the second frequency is a radio frequency (RF).

14. A set top box, comprising:
    a first set top box receiver for receiving a first signal having program information;
    a second set top box receiver for receiving coded command signals from a remote control;
    a set top box processor for determining at least one parameter indicative of a measured quality of the first signal; and
    a set top box transmitter, communicatively coupled to the set top box processor, for transmitting a second signal having first information including the parameter and second information distinct from the first information to the remote control;
    a third set top box receiver, communicatively coupled to the set top box processor, for receiving command signals from the remote control at the second frequency;
    wherein the second set top box receiver receives commands at a first frequency and the set top box transmitter transmits the signal at a second frequency.

15. A method of adjusting an antenna according to a measured quality of a first signal sensed by the antenna, comprising the steps of:

receiving the first signal in a set top box;

measuring a quality of the first signal;

transmitting a second signal having first information indicative of the measured quality of the first signal and second information distinct from the first information from the set top box to a remote control having a transmitter for transmitting commands to the set top box and a user output interface;

presenting the measured quality of the first signal with the user output interface; and adjusting the antenna according to the measured quality of the first signal;

wherein the first information is indicative of a measured quality of a second signal received by the set top box and the second information comprises augmenting information, distinct from the information indicative of the measured quality of the second signal received by the set top box.

16. The method of claim 15, wherein the step of measuring the quality of the first signal comprises the step of measuring the received strength of the first signal.

17. The method of claim 15, wherein the first signal comprises digital information and the step of measuring the quality of the first signal comprises the step of measuring the bit error rate of the digital information.

18. The method of claim 15, wherein the augmenting information is a channel number.

19. The apparatus of claim 14, wherein the set top box transmitter transmits and the set top box receiver receives signals at a radio frequency.

20. The apparatus of claim 14, wherein the first frequency is an infrared (IR) frequency, and the second frequency is a radio frequency (RF).

* * * * *